United States Patent [19]
Burgdorf

[11] Patent Number: 5,620,241
[45] Date of Patent: Apr. 15, 1997

[54] HYDRAULIC BRAKE SYSTEM WITH SLIP CONTROL

[75] Inventor: Jochen Burgdorf, Offenbach-Rumpenheim, Germany

[73] Assignee: ITT Automotive Europe GmbH, Frankfurt, Germany

[21] Appl. No.: 335,704

[22] PCT Filed: May 4, 1993

[86] PCT No.: PCT/EP93/01085

§ 371 Date: Nov. 9, 1994

§ 102(e) Date: Nov. 9, 1994

[87] PCT Pub. No.: WO93/23271

PCT Pub. Date: Nov. 25, 1993

[30] Foreign Application Priority Data

May 9, 1992 [DE] Germany .......................... 42 15 280.1

[51] Int. Cl.⁶ .................................................. B60T 13/68
[52] U.S. Cl. ...................................... 303/186; 303/113.5
[58] Field of Search ............................. 303/11, 139, 145, 303/113.5, 115.4, 116.1, 186

[56] References Cited

U.S. PATENT DOCUMENTS

| | | |
|---|---|---|
| 4,480,877 | 11/1984 | Resch ................................. 303/113.5 X |
| 4,643,487 | 2/1987 | Neubrand . |
| 4,699,436 | 10/1987 | Klein . |
| 4,720,151 | 1/1988 | Belart et al. ....................... 303/113.5 X |
| 5,267,783 | 12/1993 | Inoue et al. ....................... 303/113.5 X |
| 5,350,226 | 9/1994 | Burgdorf et al. . |

FOREIGN PATENT DOCUMENTS

| | | |
|---|---|---|
| 0285253 | 10/1988 | European Pat. Off. . |
| 0336278 | 10/1989 | European Pat. Off. . |
| 2667557 | 4/1992 | France . |
| 3323402 | 10/1984 | Germany . |
| 3403911 | 11/1985 | Germany . |
| 3431326 | 3/1986 | Germany . |
| 3440541 | 5/1986 | Germany . |
| 3737316 | 7/1988 | Germany . |
| 4003579 | 6/1991 | Germany . |
| 4036940 | 8/1991 | Germany . |
| 1204847 | 8/1989 | Japan . |
| 2200177 | 7/1988 | United Kingdom ................ 303/115.4 |
| 9015738 | 12/1990 | WIPO . |

*Primary Examiner*—Lee W. Young
*Attorney, Agent, or Firm*—Thomas N. Twomey; J. Gordon Lewis

[57] ABSTRACT

A pressure-medium displacing element is connected to the main pressure line which leads to the rear-wheel brake, and a first end surface of the pressure-medium displacing element is acted upon by the pressure of the auxiliary-pressure pump, while the pressure prevailing in the rear-wheel brake is applied to the second end surface which is opposed to the first end surface.

36 Claims, 6 Drawing Sheets

HYDRAULIC BRAKE SYSTEM WITH SLIP CONTROL

This application is the U.S. national-phase application of PCT International Application No. PCT/EP93/01085.

BACKGROUND OF THE INVENTION

The present invention relates to a hydraulic brake system with slip control.

In prior-art brake systems of this type, for example, DE-OS 33 23 402, the braking pressure is influenced in response to the rotational behavior of the wheels by means of electromagnetically operable inlet and outlet valves in order to prevent locking of the wheels due to excessive brake application, on the one hand, and to conform the brake force distribution to the front and the rear wheels to the prevailing braking situation, on the other hand. The provision of controlling the brake force distribution permits taking into consideration the influence of the effects of varying load conditions of a vehicle under static or dynamic axle-load shift. To preserve driving stability, it is necessary that the rear wheels will not lock before the front wheels.

According to the above-mentioned German patent application, inlet valves, which are multiple-way valves closed in their inactive position, are inserted into the main pressure lines leading to the rear wheels to control the brake force distribution. In contrast thereto, the inlet valves leading to the front wheels are open in their inactive position permitting the passage of pressure medium. Due to clockwise actuation of the valves, an amount of brake slip results at the rear wheels which is always smaller than that at the front wheels. This way, the rear wheels contribute a great deal to deceleration, while, simultaneously, over-braking of the rear wheels is prevented.

As disclosed in the above cited publication, the inlet and the outlet valves, the wheel sensors, the analyzing electronics and the auxiliary-pressure supply system are used for the control of the brake force distribution as well as for the anti-lock control, but the disadvantage is that no braking effect will result at the rear axle upon the occurrence of a malfunction in the electric or electronic unit, which activates the inlet valves of the rear-axle brake.

Further, DE-OS 34 40 541 discloses a brake system which is equipped with wheel valves exclusively for the electronic control of the brake force distribution. Therefore, only the brake lines leading to the rear-wheel brakes contain wheel valves, i.e. solenoid valves closed in their inactive position. Connected in parallel to the wheel valves is a brake force regulator, through which, on brake application, braking pressure propagates to the rear-wheel brakes which is conformed to the minimum pressure in response to the respective deceleration, with ideal brake force distribution. The braking pressure is raised to a higher value which is optimally adapted to the instantaneous situation by actuation of the wheel valves. This arrangement is based on the consideration that a minimum amount of braking pressure be conveyed to the rear-wheel brakes by way of the brake force regulator even upon power failure or a valve defect so that the rear axle can participate in braking the vehicle even when such malfunctions occur. However, the disadvantage of such a brake system is that the effect of the brake force distributor does not reach the optimal, theoretically possible value. On the other hand, the pressure transmitted via the parallel branch may already cause wheel lock in certain braking situations.

SUMMARY OF THE INVENTION

An objective of the present invention is to improve the utilization of brake forces at the rear wheels in a brake system with slip control by increasing the share of the rear wheels in deceleration and, additionally, to provide a high degree of safety against malfunctions. The braking effect of the rear wheels is preserved even upon failure of the power supply or when similar defects occur. Locking of the rear wheels prior to locking of the front wheels which, as is known, jeopardizes the driving stability of a vehicle, is prevented as before. A feature of this brake system is a low-cost mode of operation which, nevertheless, is improved in respect of comfort, in particular by minimized valve noises and pump noises and by minimum pedal pulsations.

This objective is achieved, according to the present invention, by a system in which a pressure-medium displacing element is connected to the main pressure line which leads to the rear-wheel brake, with the pressure of the auxiliary-pressure pump applied to a first end surface of the pressure-medium displacing element, with the first end surface in selective fluid communication with the front-wheel brake, while the pressure prevailing in the rear-wheel brake is applied to a second end surface which is opposed to the first end surface.

This ensures that, during the brake slip control operation, the pressure-medium displacing element connected with the rear-wheel brake absorbs the control noises of the pump and the pedal pulsations, because the pressure-medium displacing element acts as a damping accumulator. Further, it is possible during the pressure modulation (ABS mode), by reapportioning the front-axle braking pressure to the rear-axle braking pressure, to bridge the effect of the brake force distributor and to augment the effect, with appropriate dimensioning, to reduce the stopping distance.

Preferred embodiments of the present invention are disclosed and explained in detail with reference to further features and advantages of the present invention by way of several drawings.

DETAILED DESCRIPTION OF THE INVENTION

Figure 1:
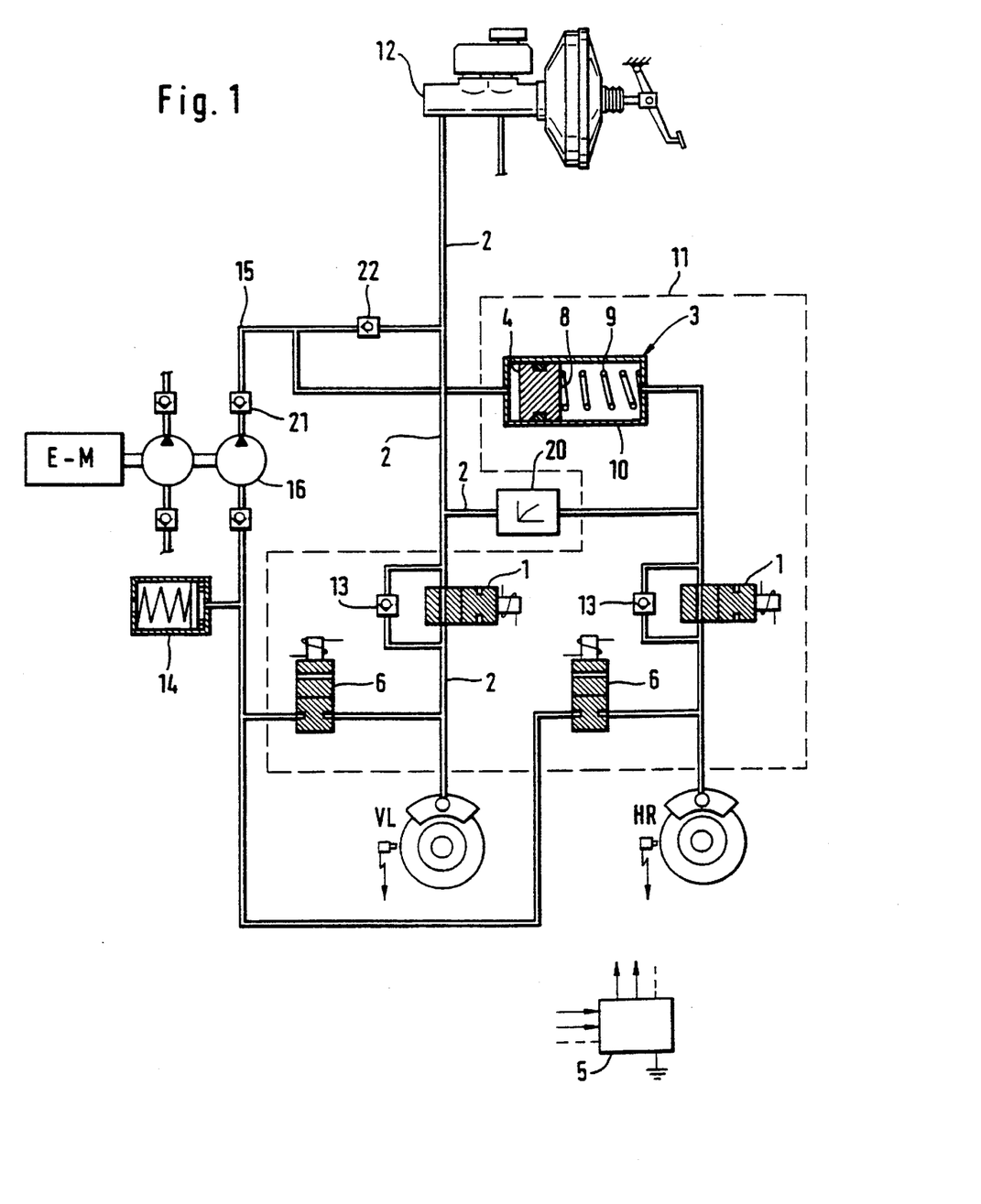
FIG. 1 shows a first embodiment of a hydraulic brake system constructed in accordance with the present invention.

FIG. 1 shows in a simplified illustration, as an example, the elements necessary to actuate a diagonal rear-wheel brake HR and front-wheel brake VL. A main pressure line 2, which has a rear-wheel branch and a front-wheel branch which, respectively, lead to rear-wheel brake HR and front-wheel brake VL, is connected to a pedal-operable master cylinder 12 preferably assisted by auxiliary force. Associated with each of the brakes VL, HR is a pressure modulation valve 1 (inlet valve) which is open in its electromagnetically deenergized, initial position. In parallel with each of the brakes VL, HR is a non-return valve 13 opening in the direction of the master cylinder 12. Also associated with each of the brakes VL, HR is an electromagnetically closed pressure modulation valve 6 (outlet valve). A reservoir 14 is connected downstream of the pressure modulation valves 6. Reservoir 14, which can be connected as an unpressurized supply reservoir to the master cylinder 12 or as a low-pressure accumulator of a closed-loop brake system, can be connected directly to the pressure medium return line which supplies an auxiliary-pressure pump 16 with pressure medium. The auxiliary-pressure line 15 is connected to the main pressure line 2 between the master cylinder 12 and the pressure modulation valve 1 which is associated with the front-wheel brake VL and is open in its deenergized, initial position, while the pressure modulation valve 6, which is associated with the rear-wheel brake HR and acts as an outlet valve which is closed in its initial position, is interposed between the pressure modulation valve 1 associated with the rear-wheel brake HR and the rear-wheel brake HR. Further, a brake force distributor 20 is connected to the main pressure line 2 upstream of the inlet valve 1 associated with the front-wheel brake VL. The outlet of pressure-controlled brake force distributor 20 is connected to inlet valve i associated with the rear-wheel brake HR.

In addition to this basic structure of a brake circuit of a slip-controlled brake system, there is a pressure-medium displacing element 3 which is connected in parallel to the brake force distributor 20. The pressure-medium displacing element 3 can be connected at a number of appropriate positions to the pressure side of the auxiliary-pressure pump 16 for operation of the system.

The pressure-medium displacing element 3 is composed of a piston which is sealed and axially movable in a housing 10. In the position of the pressure-medium displacing element shown in the drawing, the piston, subjected to the force of a compression spring 9, is shown in an initial position in which the volume is increased towards the rear-wheel brake HR. To provide a rear-wheel braking pressure which is higher compared to the front-wheel brake VL, the piston can be furnished with a step. The piston step, having the large effective surface, is exposed to the pressure of the auxiliary-pressure pump 16. To prevent undesirable medium volume input and, thus, a hysteresis of the brake system through the chamber of the pressure-medium displacing element 3 on operation of the master cylinder 12, a non-return valve 22, which closes in the direction of the pressure-medium displacing element 3, is inserted in front of the pressure-medium displacing element 3. The pressure-medium displacing element 3 may be arranged in a valve housing block 11 with the pressure modulation valves 1, 6 and the non-return valves 13, or modularly at the valve housing block 11 or the pump assembly.

The operation of the FIG. 1 brake system will now be explained with reference to the preceding description.

During normal braking operations in the range of small, acceptable slip values, the pressure medium introduced by the master cylinder 12 into the main pressure line 2 propagates through the front-wheel branch of the main pressure line in proportion to the pedal force via the inlet valve 1, which is open in its initial position, to the front wheel brake VL. Simultaneously, the rear-wheel brake HR is subjected to pressure by way of the brake force distributor 20, connected to the main pressure line 2, and through the inlet valve 1 in the rear-wheel branch of the main pressure line. The pressure build-up in the rear-wheel brake HR is applied according to the brake-force distributor characteristic curve. In contrast, the pressure-medium displacing element 3 remains in the initial position, which is defined by the compression spring 9 and the volume is expanded in relation to the wheel brake connection, because the auxiliary-pressure pump 16 is deactivated during normal braking operations.

When a brake slip control operation is commenced due to excessive slip values, the pressure modulation valves 1, 6 are operated in a known manner in phases in which the pressure is maintained constant, reduced and increased. However, on the start of the auxiliary-pressure pump 16, simultaneously, the medium volume in the pressure-medium displacing element 3 is displaced through the piston to the rear-wheel brake HR. Then, the pressure-medium displacing element 3 is superimposed on the effect of the brake force distributor 20 so that the brake force distributor 20 is bridged in the ABS-case. The advantage is that, when the pressure-medium displacing element 3 is dimensioned correspondingly, for example, by use of a stepped filling piston, the rear-wheel braking pressure may exceed the front-wheel braking pressure to achieve shorter stopping distances by way of an optimal adherence ability and lowest pedal forces during ABS-operation. Another positive effect of the present invention is the considerably reduced control noise during ABS-operation. In particular, the pressure pulsations of the auxiliary-pressure pump 16 are damped by the hydraulic connection between the rear-wheel brake HR and the effect of the pressure-medium displacing element in respect of medium volume expansion and medium volume compression. Further, since the medium volume, which is discharged from the front-wheel brake VL during slip control, is displaced or reapportioned by the pressure-medium displacing element in the direction of the rear-wheel brake HR, the brake pedal is protected against major pressure pulsations. In this way, the first end surface of the pressure-medium displacing element can be said to be in selective fluid communication with the front-wheel brake.

Figure 2:
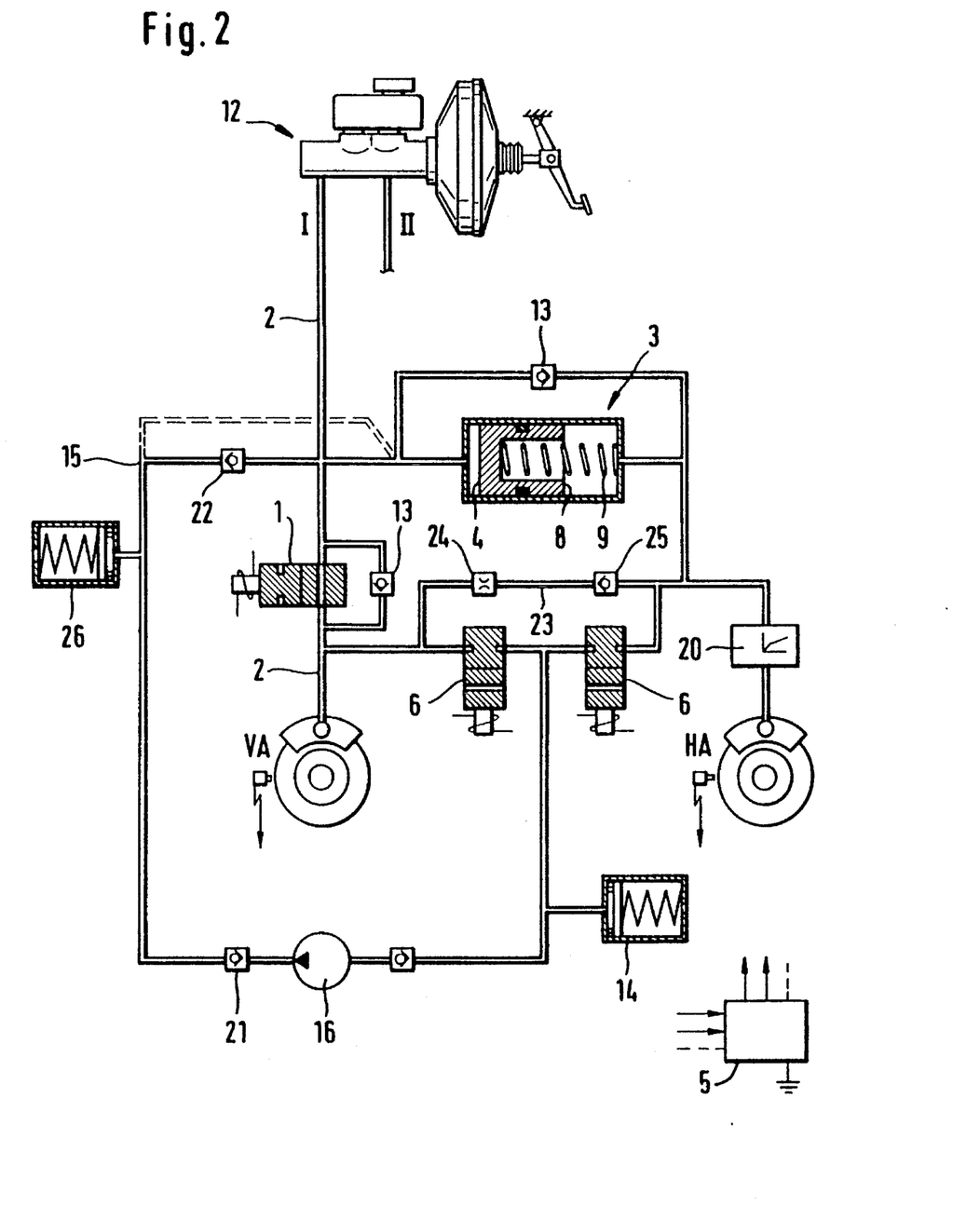
FIG. 2 shows a second embodiment of a hydraulic brake system constructed in accordance with the present invention.

For clearer illustration, FIG. 2 shows only one brake circuit in a diagonal allotment for an anti-lock brake system. The two pressure modulation valves 1 which, in their function as inlet and outlet valves, are connected upstream of the front wheel brake VA, and the auxiliary-pressure pump 16 and the reservoir 14 which are connected downstream of the outlet valves 6 of the front-wheel/rear-axle brake VA, HA basically correspond to the design in FIG. 1. In contrast to FIG. 1, the brake force distributor 20 is connected in series with the pressure-medium displacing element 3. Brake force distributor 20 is integrated in a circuit path 23 interposed between the pressure modulation valves 1, 6 of the front-wheel brake VA. Circuit path 23 includes a throttle 24 and a non-return valve 25 which closes in the direction of the front-wheel brake VA, both elements being connected in series upstream of the brake force distributor 20 associated with the rear-wheel brake HA.

During the ABS control operation, non-return valve 25 prevents the escape of the pressure medium volume, displaced by the pressure-medium displacing element 3 in the direction of the brake force distributor 20, to the front-wheel brake VA. Accordingly, the port of the pressure-medium displacing element 3, effective in the direction of the rear-wheel brake HA, terminates into the circuit path 23 between the brake force distributor 20 and the non-return valve 25. Throttle 24, which is connected up-stream in series with the non-return valve 25, calibrates the pressure-medium volume which flows from the front-wheel brake VA to the brake force distributor 20. The above-described circuit configuration permits raising the rear-wheel braking pressure in excess of the pressure level of the front-axle brake, by attaining the maximum adherence ability to thereby achieve a shorter stopping distance. The rate of the filling volume, which can be displaced to the rear-axle brake by way of the pressure-medium displacing element 3, is decisive for the desired optimal pressure increase at the rear axle during the ABS control operation. In this respect, it is required to appropriately dimension the piston stroke and the piston diameter of the displacement piston. Another advantage of the described circuit configuration is the reduced number of valves required, because one pressure modulation valve is eliminated in each case, which normally operates as an inlet valve with the rear-wheel brake HA. The pressure port of the pressure-medium displacing element 3 remote from the brake force distributor 20 is either connected directly to the main pressure line 2, or to the pump pressure side, as shown by the dashed line connection in FIG. 2 and described above in FIG. 1. For the quick manual release of the rear-wheel brake HA, a non-return valve 13, opening in the direction of the master cylinder, is arranged in parallel with pressure modulation valve 1 in the front-wheel branch of the main pressure line. To ensure the operability of a master cylinder 12 furnished with cup seals, a pressure-medium accumulator 26 is connected to the pressure side of the auxiliary-pressure pump 16.

The operation of the FIG. 2 brake system will now be explained with reference to the preceding description.

In the normal braking position, pressure medium which is introduced into the main pressure line 2 in proportion to pedal force is conveyed through the open pressure modulation valve 1 to the front-wheel brake VA and, through the throttle 24 and the non-return valve 25, to the brake force distributor 20 which, according to its dimensioning, determines the braking pressure of the rear-wheel brake HA. The pressure-medium displacing element 3, the auxiliary-pressure supply system and the closed pressure modulation valves 6 are not activated.

When the brake slip control operation (ABS) commences, the auxiliary-pressure pump 16 starts to operate and supplies the pressure medium volume of the wheel brakes from the reservoir 14 through the electromagnetically opened pressure modulation valves 6 (outlet valves) in the direction of the pressure-medium displacing element 3, which displaces pressure medium to the brake force distributor 20 and, hence, to the rear-wheel brake HA irrespective of the control condition of the front-wheel brake VA. The braking pressure in the rear-wheel brake HA is determined in response to the slip signals issued by a controlling and regulating electronic unit 5, by way of operation of the pressure modulation valve 6 (outlet valve) which is associated with the rear-wheel brake HA.

Another advantage of the circuit configuration according to the present invention is that an independent pressure increase in the rear-wheel brake HA is possible in spite of the engine stall torque of a front-wheel driven vehicle and the imminent locking tendency of the front wheels. Apart from the advantages in respect of minimized noises, shorter stopping distances and reduced pedal pulsations mentioned already with regard to FIG. 1, the number of solenoid valves needed is reduced. The number of necessary valves in an anti-lock automotive vehicle brake system with front-wheel/ rear-wheel brake circuit split-up is reduced to six valves.

Figure 3:
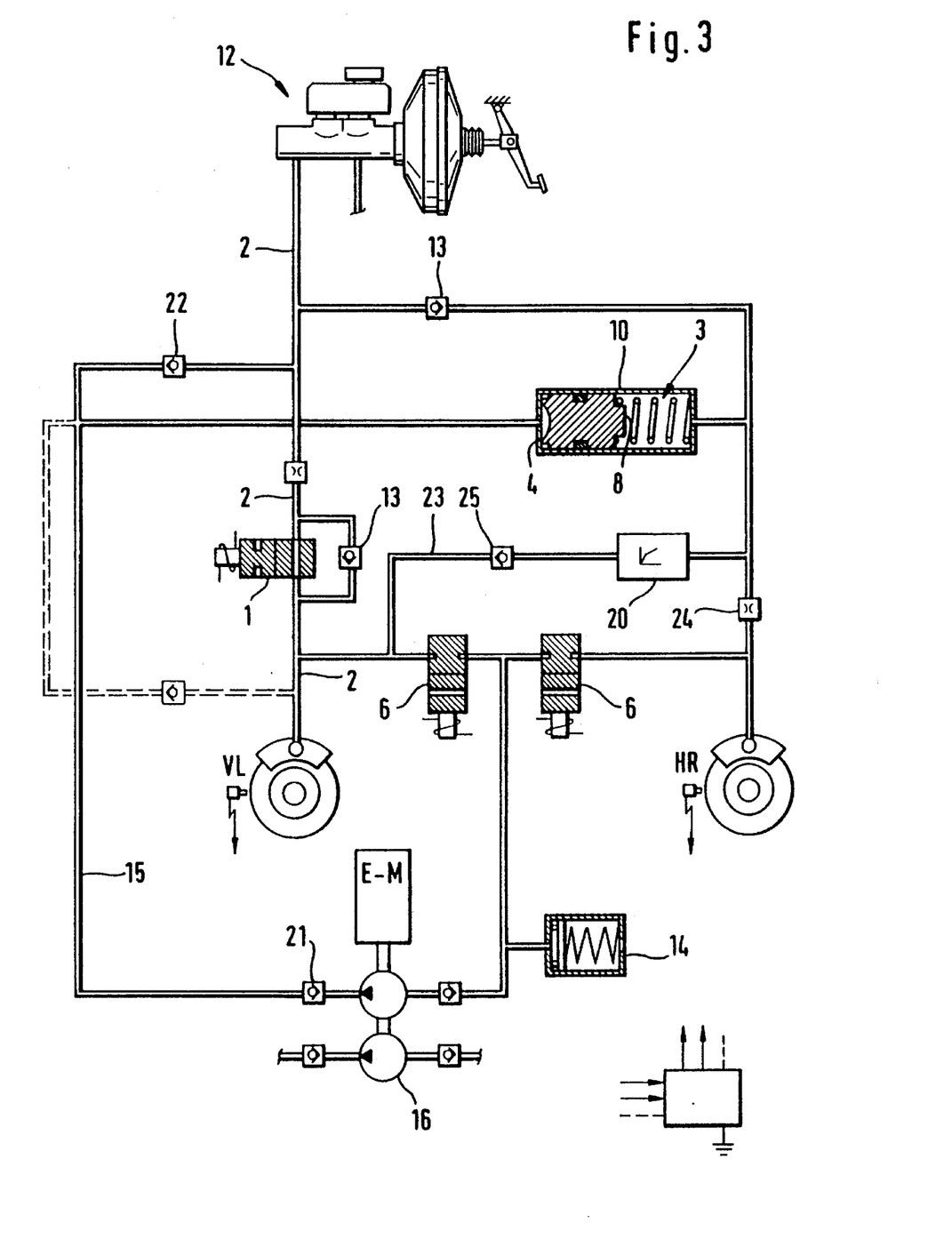
FIG. 3 shows a third embodiment of a hydraulic brake system constructed in accordance with the present invention.

FIG. 3 shows an anti-lock brake system in diagonal circuit split-up. However, only one diagonal is shown to illustrate the present invention. The brake force distributor 20 and the pressure-medium displacing element 3 are arranged in parallel to each other. Analogous to the embodiment of FIG. 2, the pressure modulation valves 1, 6, which are open and closed in their deenergized state, are associated with the front-wheel and rear-wheel brakes VL, HR. The circuit path 23 connected to the front-wheel brake VL establishes a hydraulic connection to the diagonal rear-wheel brake HR through a non-return valve 25, the brake force distributor 20 and the throttle 24. The pressure-medium displacing element 3, in series connection with the throttle 24, is connected with its volume accumulator to the diagonal rear-wheel brake HR. The brake force distributor 20, in the illustrated alternative circuit configuration, is arranged between the throttle 24 and the non-return valve 25 which closes in the direction of the front-wheel brake VL. The circuitry of the auxiliary-pressure pump 16 corresponds to the FIG. 2 embodiment.

The arrangement of the non-return valve 22, closing in the direction of the auxiliary-pressure pump 16, can be either the same as shown in FIG. 2, or alternatively, can be effected, as shown by the dashed lines, by connecting the non-return valve to the main pressure line 2 between the pressure modulation valve 1 (inlet valve) and the front-wheel brake VL.

During the anti-lock control operation, the pressure build-up at the rear-wheel brake HR is achieved by way of the pressure-medium displacing element 3, to which the pump pressure is applied and which bridges the brake force distributor 20. In a brake system provided as a two-channel anti-lock system, an optimal adherence ability during slip control can be achieved, and the indicated construction criteria (characteristic of displacement of the pressure-medium displacing element) permit achievement of a higher anti-lock control pressure at the rear-wheel brake HR, if required, than at the front-wheel brake. Besides, at low friction values and with front-wheel slip of a front-wheel driven vehicle, which is due to the engine stall torque, the circuit configuration according to the present invention permits an optimal pressure build-up at the rear-wheel brake HR until the locking limit of the wheel which is comparable with the control quantity of a three-channel anti-lock system. Another advantage is realized at the beginning of the control, because the medium volume discharged from the front-wheel brake VL is returned into the rear-wheel brake but not into the master cylinder and pedal pulsations are almost. In addition, the auxiliary-pressure pump is optimally damped, because the pressure-medium displacing element is acted upon by the rear-wheel pressure. Thus, there is no need for a damping accumulator downstream of the auxiliary-pressure pump 16.

Figure 6:
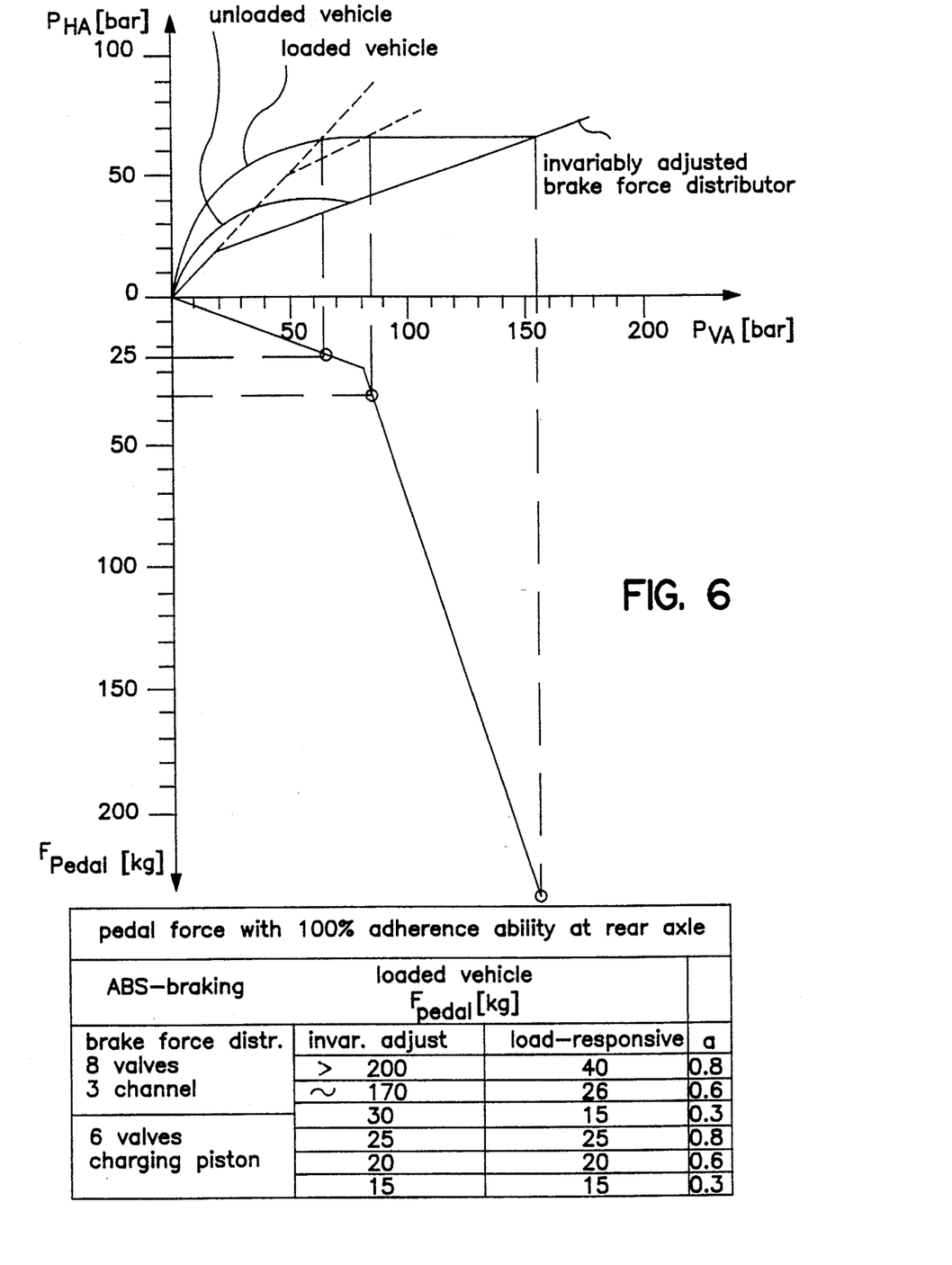
FIG. 6 is a brake force distributor diagram with an associated pedal force characteristic curve.

Summarizing, and as can be taken from FIG. 6, a substantially simplified brake system is obtained which has a performance characteristic comparable with a three-channel or 8-valve anti-lock system, although the number of valves is reduced (six pressure modulation valves) and a load-responsive brake force distributor is eliminated.

Figure 4:
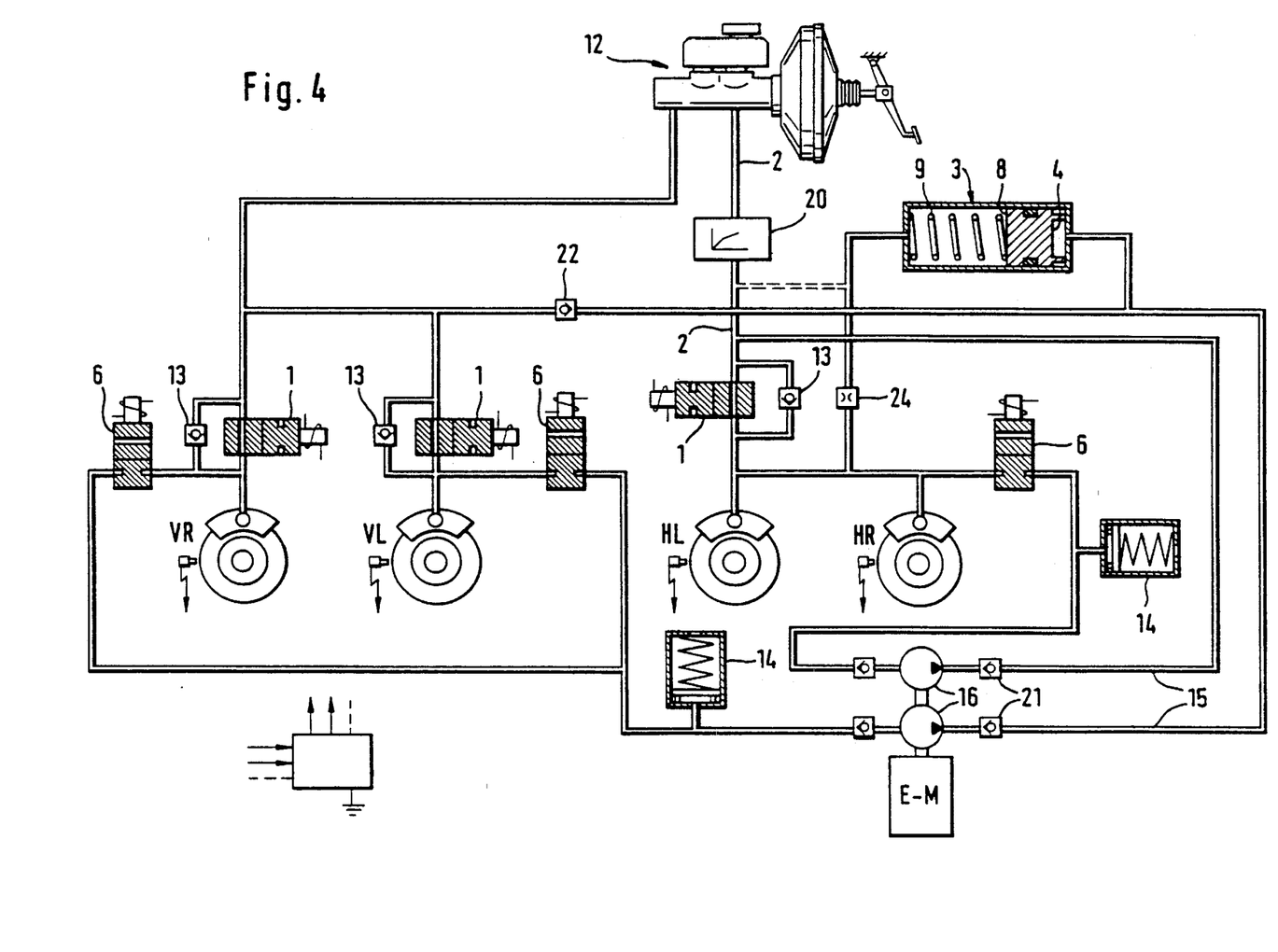
FIG. 4 shows a fourth embodiment of a hydraulic brake system constructed in accordance with the present invention.

FIG. 4 shows a hydraulic circuit configuration for a dual-circuit slip-controlled brake system in front-axle/rear-axle brake circuit allotment. The front-axle brake circuit includes a pair of electromagnetic pressure modulation valves 1, 6 associated with each wheel brake which function as inlet and outlet valves, respectively. A reservoir 14 (e.g. low-pressure accumulator) is connected to the outlet valves 6 of the front-axle brake circuit, as well as the auxiliary-pressure pump 16 which acts upon the pressure-medium displacing element 3 and supplies the pressure medium through a non-return valve 22, inserted into the auxiliary-pressure line 15, in the direction of the front-axle brakes VR, VL and into the master cylinder 12. The port of the pressure-medium displacing element 3 opposite to the pump pressure side has a throttle 24 which is connected to the junction of the inlet and the outlet valves of the rear-axle brakes HL, HR. Additional supply of auxiliary pressure is furnished by a second auxiliary-pressure pump 16 positioned between the outlet valve of the rear-axle brakes and the rear wheel branch of the main pressure line 2. The brake force distributor 20 is positioned between the inlet valve 1 of the rear-axle brake HR, HL and the master cylinder 12 in the main pressure line 2. Instead of being connected into the junction of the inlet valve and the outlet valve, the pressure-medium displacing element 3 may be connected into the main pressure line 2 at the junction of the brake force distributor 20 and the inlet valve as shown by the dashed lines in FIG. 4.

During a normal braking operation, braking pressure proportional to pedal force is conveyed to the front-wheel brakes VR, VL through pressure modulation valves 1 of the front-axle brake circuit, which are open in their initial position. The non-return valve 22, which is inserted into the auxiliary-pressure line 15 of the front-axle brake circuit, prevents the pressure medium from escaping into the pressure-medium displacing element 3. The pressure in the rear-axle brake circuit is defined by the characteristic curve of the brake force distributor 20. All other elements maintain their initial position shown in the drawing.

At the commencement of brake slip control, the two auxiliary-pressure pumps 16 start to operate, and the medium volume discharged from the front-wheel brakes VR, VL through the outlet valves 6 is pumped into the pressure-medium displacing element 3. The result is that pressure medium volume is displaced from the pressure-medium displacing element to the rear-wheel brakes irrespective of the switch position of the inlet valve associated with the rear-wheel brakes HR, HL and irrespective of the brake force distributor 20. The medium volume which can be displaced by the pressure-medium displacing element 3 dictates the maximum pressure increase in the rear-wheel brakes which, in case of need (i.e. low friction value), can be decreased during the ABS-pressure modulation by operation of the inlet valve and outlet valve.

Figure 5:
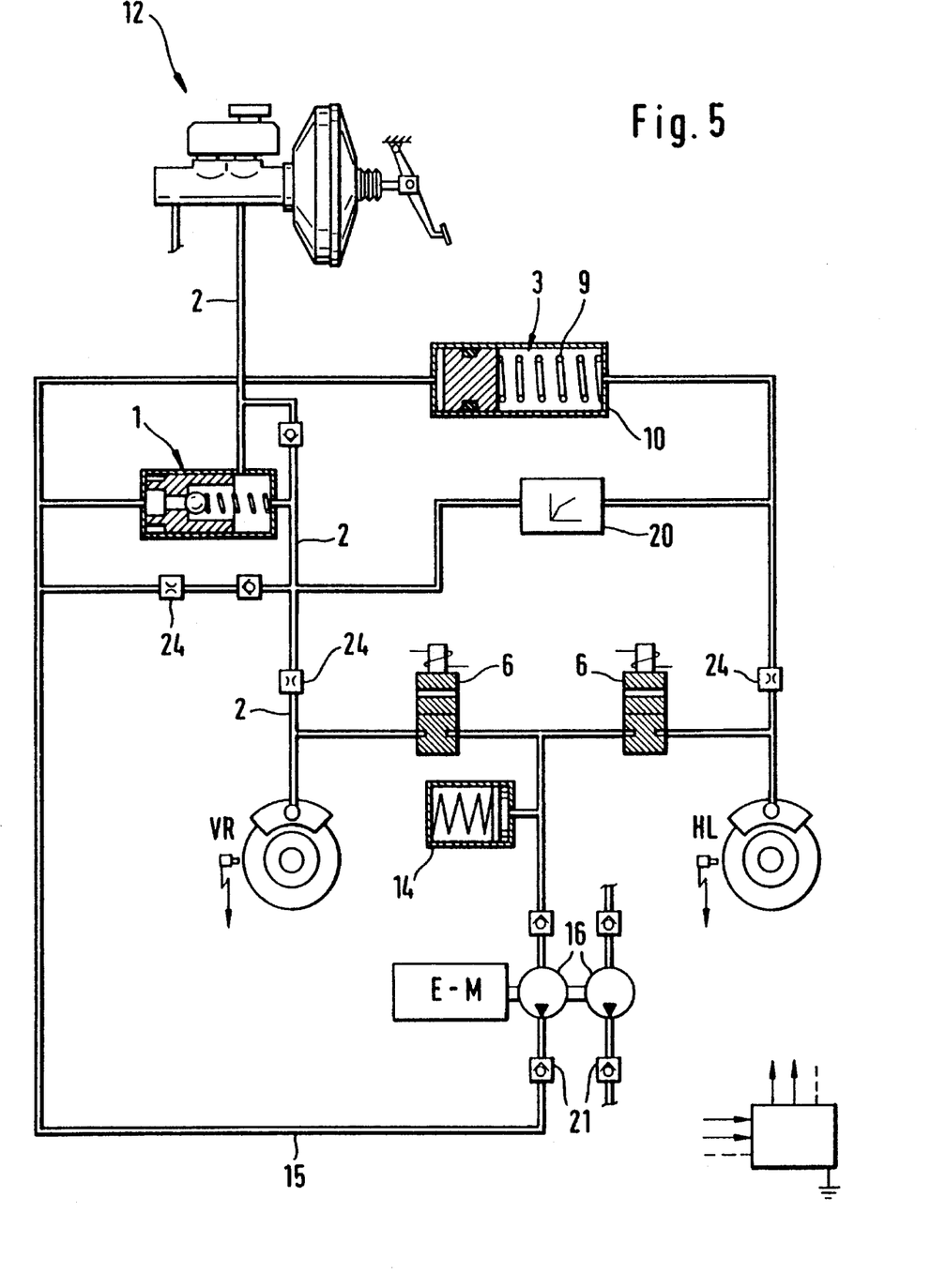
FIG. 5 shows a fifth embodiment of a hydraulic brake system constructed in accordance with the present invention.

Another favorable arrangement of the subject matter of the present invention in an anti-lock brake system with diagonal brake-circuit split-up can be seen in FIG. 5. For improved clarity of illustration of the present invention, only the brake circuit diagonal between the right front-wheel brake VR and the left rear-wheel brake HL is shown as an example. As in all other embodiments shown, the displacement chamber of the pressure-medium displacing element 3, connected to the rear-wheel brake HL, has a compression spring 9 which positions the displacement piston in the initial position. Opposite thereto is the end surface of the displacement piston, to which the pump pressure is applied. During the ABS-control, the auxiliary-pressure pump 16 takes the pressure medium volume, which was in intermediate storage in the reservoir 14 supplied from the two diagonal wheel brakes VR, HL through the open outlet valves 6, and delivers the pressure medium through a line having a throttle 24 to the brake force distributor 20 connected to the wheel brake HL. Part of the pump pressure acts upon the piston of a hydraulically controllable pressure modulation valve 1 which releases the connection between the master cylinder 12 and the front-wheel brake VR in its initial position. The inlet to the two wheel brakes VR, HL is in each case calibrated by restrictors 24 or throttles. The purpose of the pressure modulation valve 1 is to isolate the master cylinder 12 from the wheel brakes VR, HL during the ABS-control, thereby preventing pedal pulsations. In the case of ABS-control, the effect of the brake force distributor 20 is superimposed by the effect of the pressure-medium displacing element 3 so that, with the pressure-medium displacing element being appropriately dimensioned, the rear-wheel braking pressure exceeds the front-wheel braking pressure as long as the outlet valve associated with the rear-wheel brake HL opens to initiate the phase of pressure reduction.

In addition to the advantages already set forth, the above hydraulic concept is distinguished by requiring a minimum number of electromagnetically controlled pressure modulation valves, only four solenoids being necessary for the complete brake system of a four-wheel automotive vehicle.

FIG. 6 shows as an example a comparison between a customary, state-of-the-art three-channel anti-lock system (eight pressure modulation valves) and the anti-lock system according to the present invention which includes six pressure modulation valves and charging pistons, as described in FIG. 3. Under the condition of an equal deceleration value 'a', the necessary pedal force Fp is illustrated as a function of an invariably adjusted or a load-responsive brake force distributor for a loaded vehicle. It can be seen in the table and the graph that in the ABS-case, irrespective of whether an invariably adjusted or a load-responsive brake force distributor is used, pedal forces can be achieved, which are proportional and, in addition, relatively small, with an identical brake deceleration and assuming a 100% adherence ability at the rear axle, by bridging the brake force distributor by means of a pressure-medium displacing element and by use of the charging piston. Thus, the present invention obviates the need for a load-responsive brake force distributor, without entailing pedal force increase.

It should be noted that, in the diagram in FIG. 6, the rear-axle braking pressure pHA and the necessary pedal force Fp extend along the ordinate. The braking pressure values of the front axle pVA extend along the abscissa. Characteristics, and the achievement thereof, for the invariably adjusted or the load-responsive brake force distributor have been taken from the state of the art, so that herein reference is made only to the specialized literature, such as by Dr. Ing. HansStrien, "Auslegungen und Berechnungen von PKW-Bremsanlagen" ('Dimensioning and Rating of Automotive Vehicle Brake Systems'), ALFRED TEVES GMBH, 6000 Frankfurt/Main.

LIST OF REFERENCE NUMERALS 1 pressure modulation valve (inlet valve)
2 main pressure line
3 pressure-medium displacing element
4 first end surface
5 controlling and regulating electronic unit
6 pressure modulation valve (outlet valve)
8 second end surface
9 compression spring
10 housing
11 valve housing block
12 master cylinder
13 non-return valve
14 reservoir
15 auxiliary-pressure line
16 auxiliary-pressure pump 20 brake force distributor
21 pressure valve
22 non-return valve
23 circuit path
24 throttle/restrictor
25 non-return valve
26 pressure-medium accumulator
VL left front-wheel brake
VR right front-wheel brake
HR right rear-wheel brake
HL left rear-wheel brake
VA front-wheel brake
HA rear-wheel brake
a deceleration
pHA rear-axle braking pressure
pVA front-axle braking pressure
Fp pedal force

I claim:

1. A hydraulic brake system with slip control, including a pedal-operable master cylinder, to which a front-wheel brake and a rear-wheel brake of an automotive vehicle are connected at least through a main pressure line, including a hydraulic auxiliary-pressure pump which is connected to an auxiliary-pressure line and takes in pressure medium from a reservoir and supplies it to the wheel brakes, and including wheel speed sensors and a controlling and regulating electronic unit to determine the wheel rotational behavior and to generate electric braking pressure control signals, said brake system further including pressure modulation valves, including at least one inlet valve and at least two outlet valves, connected to the wheel brakes to control the braking pressure, characterized in that a pressure-medium displacing element is connected to the main pressure line which leads to the rear-wheel brake, the pressure of the auxiliary-pressure pump being adapted to be applied to a first end surface of the pressure-medium displacing element, wherein said first end surface is in selective fluid communication with said front-wheel brake, and in that the pressure prevailing in the rear-wheel brake is adapted to be applied to a second end surface which is arranged opposite to the first end surface,, wherein said pressure-medium displacing element undergoes a stroke to displace a pressure from said front wheel-brake toward said rear-wheel brake.

2. A hydraulic brake system as claimed in claim 1 characterized in that said at least one inlet valve includes a rear-wheel brake inlet valve, which is electromagnetically actuated and open in its electromagnetically deenergized position, and the pressure-medium displacing element is connected between said rear-wheel brake inlet valve and the outlet of said pump.

3. A brake system as claimed in claim 2, characterized in that the pressure-medium displacing element in the braking-pressure control mode is capable of hydraulically superimposing a brake force distributor, arranged between the rear-wheel brake and the master cylinder, and in that the brake force distributor is arranged in parallel to the pressure-medium displacing element.

4. A hydraulic brake as claimed in claim 3, further comprising a pressure valve and a non-return valve disposed in said auxiliary pressure line between the auxiliary-pressure pump and the pressure-medium displacing element, said pressure valve and said non-return valve closing in the direction of the auxiliary-pressure pump, wherein the pressure of the auxiliary-pressure pump, which acts upon the first end surface of the pressure-medium displacing element, is the pressure at a point between the pressure valve and the non-return valve.

5. A brake system as claimed in claim 1, wherein said at least one inlet valve includes a rear-wheel brake inlet valve, which is electromagnetically actuated and open in its electromagnetically deenergized position, and said brake system further comprises a brake force distributor, which is arranged in series with said pressure-medium displacing element between said rear-wheel brake inlet valve and the master cylinder.

6. A brake system as claimed in claim 1 further comprising a brake force distributor, wherein the pressure-medium displacing element is connected to the main pressure line between the rear-wheel brake and the master cylinder and is in series arrangement with the brake force distributor.

7. A hydraulic brake system as claimed in claim 6, further comprising a hydraulic circuit path, which is arranged in parallel to the pressure-medium displacing element and leads to the brake force distributor, and has a throttle or diaphragm in series arrangement with a first non-return valve opening in the direction of the brake force distributor.

8. A hydraulic brake system as claimed in claim 7, wherein said at least one inlet valve includes a front-wheel brake inlet valve which is electromagnetically open in its deenergized, initial position, and the hydraulic circuit path is connected between the front-wheel brake and the front-wheel brake inlet valve.

9. A hydraulic brake system as claimed in claim 8, further comprising a second non-return valve, which closes in the direction of the auxiliary-pressure pump, and a pressure medium accumulator which is arranged between the second non-return valve and a pressure valve of the auxiliary-pressure pump.

10. A hydraulic brake system as claimed in claim 1, characterized in that a non-return valve opening in the direction of the master cylinder is positioned in a first parallel circuit to the pressure-medium displacing element.

11. A brake system as claimed in claim 1, further comprising a circuit path which is arranged in parallel to the pressure-medium displacing element and a brake force distributor which is integrated in the circuit path between a throttle or restrictor, which is connected upstream of the rear-wheel brake, and a non-return valve opening in the direction of the brake force distributor.

12. A brake system as claimed in claim 1, wherein said at least one inlet valve includes a rear-wheel brake inlet valve which is open in its electromagnetically deenergized, initial position and is associated with the rear-wheel, and wherein the pressure-medium displacing element is connected between the rear-wheel brake inlet valve and the pressure side of the auxiliary-pressure pump communicating with the front-wheel brake, and further comprising a brake force distributor which is inserted into the main pressure line between the master cylinder and the rear-wheel brake inlet valve.

13. A hydraulic brake system as claimed in claim 1, wherein said at least one inlet valve includes a front wheel brake inlet valve, interposed between the front-wheel brake and the master cylinder, wherein said front-wheel brake inlet valve can be switched over by the pressure of the auxiliary-pressure pump into an operating position disconnecting the master cylinder from the front-wheel brake, and wherein a restricted pressure medium connection, which terminates between the front-wheel brake inlet valve and the front wheel brake, is connected to the pressure side of the auxiliary-pressure pump.

14. A hydraulic brake system as claimed in claim 13, characterized in that a throttle or restrictor is connected upstream of the front-wheel brake.

15. A hydraulic brake system as claimed in claim 14, characterized in that the pressure-medium displacing element is provided as a screw-in insert unit.

16. A hydraulic brake system as claimed in claim 1, further comprising a housing for the pressure-medium displacing element, wherein said housing is an integral part of a valve housing block accommodating the pressure modulation valves.

17. A hydraulic brake system as claimed in claim 1, characterized in that the pressure-medium displacing element includes a stepped piston which is sealed in the housing, the second piston end surface having a small nominal diameter being adapted to be acted upon by the pressure of the rear-wheel brake, while the larger first piston end surface is adapted to be acted upon by the pressure of the auxiliary-pressure pump.

18. A hydraulic brake system as claimed in claim 1, wherein the pressure displaced by said pressure-medium displacing element is displaceable in dependence on the stroke and the nominal diameter of the second end surface and corresponds to the wheel braking pressure which is necessary for the slip-free deceleration of the rear-wheel brake.

19. A brake system as claimed in claim 1 wherein said pedal-operable master cylinder is assisted by auxiliary force.

20. A hydraulic brake system with slip control comprising:

a master cylinder;

a main pressure line having a front-wheel branch and a rear-wheel branch;

an auxiliary-pressure line;

a front-wheel brake associated with a front wheel and connected to said master cylinder through said front-wheel branch of said main pressure line;

a rear-wheel brake associated with a rear wheel and connected to said master cylinder through said rear-wheel branch of said main pressure line;

a pressure-medium reservoir;

an auxiliary-pressure pump connected to said auxiliary-pressure line for supplying pressure medium from said pressure-medium reservoir to said front-wheel brake and said rear-wheel brake;

a front-wheel sensor for developing a front-wheel signal representative of the wheel rotation behavior of the front wheel;

a rear-wheel sensor for developing a rear-wheel signal representative of the wheel rotation behavior of the rear wheel;

a controlling and regulating electronic unit responsive to said front-wheel signal and said rear-wheel signal for determining the wheel rotation behavior of the front wheel and the rear wheel and for generating braking pressure control signals;

pressure modulation valves, including at least one inlet valve and at least two outlet valves, in said front-wheel branch of said main pressure line and said rear-wheel branch of said main pressure line responsive to said braking pressure control signals for regulating pressure medium flow to said front-wheel brake and said rear-wheel brake to control braking pressure in said front-wheel brake and said rear-wheel brake; and a pressure-medium displacing element, having a first end and a second end having a nominal diameter, which undergoes a stroke to displace a pressure from said front wheel-brake toward said rear-wheel brake and is connected in said rear-wheel branch of said main pressure line and responsive to:

(a) pressure of the pressure medium supplied by said auxiliary-pressure pump to a first end surface of said pressure-medium displacing element, wherein said first end surface is in selective fluid communication with said front-wheel brake, and (b) pressure of the pressure medium prevailing in said rear-wheel brake applied to a second end surface of said pressure-medium displacing element opposite to said first end surface;

wherein the pressure displaced by the stroke and the nominal diameter of said second end surface corresponds to the wheel braking pressure which is necessary for slip-free deceleration of said rear-wheel brake.

21. A hydraulic brake system according to claim 20 wherein said at least one inlet valve includes a rear-wheel brake inlet valve, which is electromagnetically actuated and open in its electromagnetically deenergized position, and said pressure-medium displacing element is connected between said rear-wheel brake inlet valve and the outlet of said pump.

22. A hydraulic brake system according to claim 21 further including a brake force distributor arranged between said rear-wheel brake and said master cylinder and in parallel with said pressure-medium displacing element.

23. A hydraulic brake system according to claim 20 further including:

(a) a pressure valve in said auxiliary-pressure line at the pressure side of said auxiliary-pressure pump, and (b) a non-return valve between said pressure valve and said master cylinder which closes in the direction of said auxiliary-pressure pump, and wherein the pressure of said auxiliary-pressure pump which acts upon said first end surface of said pressure-medium displacing element is the pressure at a point between said pressure valve and said non-return valve.

24. A hydraulic brake system according to claim 23, wherein said at least one inlet valve includes a rear-wheel brake inlet valve, which is electromagnetically actuated and open in its electromagnetically deenergized position, and said system further comprises a brake force distributor arranged in series with said pressure-medium displacing element and between said master cylinder and said rear-wheel brake inlet valve.

25. A hydraulic brake system according to claim 20 further including a brake force distributor connected in series with said pressure-medium displacing element between said rear-wheel brake and said master cylinder.

26. A hydraulic brake system according to claim 25 further including a non-return valve connected in parallel with said pressure-medium displacing element and opening in the direction of said master cylinder.

27. A hydraulic brake system according to claim 25 further including a hydraulic circuit path connected to said brake force distributor and in parallel with said pressure-medium displacing element and having:

(a) a non-return valve opening in the direction of said brake force distributor, and (b) a throttle in series with said non-return valve.

28. A hydraulic brake system according to claim 27 wherein:

(a) said at least one inlet valve includes a front-wheel brake inlet valve which is electromagnetically open in its deenergized, initial position, and (b) said hydraulic circuit path is connected into said front-wheel branch of said main pressure line between said front-wheel brake and said front-wheel brake inlet valve.

29. A hydraulic brake system according to claim 20 further including:

(a) a pressure valve in said auxiliary-pressure line at the pressure side of said auxiliary-pressure pump, (b) a non-return valve between said pressure valve and said master cylinder which closes in the direction of said auxiliary-pressure pump, and wherein said pressure-medium reservoir is a pressure-medium accumulator connected into said auxiliary-pressure line between said non-return valve and said pressure valve.

30. A hydraulic brake system according to claim 20 further including:

(a) a throttle connected upstream of said rear-wheel brake, (b) a hydraulic circuit path connected in parallel with said pressure-medium displacing element, (c) a non-return valve in said hydraulic circuit path and opening in the direction of said brake force distributor, and (d) a brake force distributor in said hydraulic circuit path between said throttle and said non-return valve.

31. A hydraulic brake system according to claim 20 wherein:

(a) said at least one inlet valve includes a rear-wheel brake inlet valve which is open in its electromagnetically deenergized, initial position and is associated with the rear-wheel;

(b) said system further includes a brake force distributor in said main pressure line between said master cylinder and said rear-wheel brake inlet valve;

(c) said pressure-medium displacing element is connected between said rear-wheel brake inlet valve and the pressure side of said auxiliary-pressure pump, and (d) said pressure side of said auxiliary-pressure pump is connected to said front-wheel brake.

32. A hydraulic brake system according to claim 20, wherein said at least one inlet valve includes a front-wheel brake inlet valve which switches by the pressure of said auxiliary-pressure pump into a position disconnecting said master cylinder from said front-wheel brake, and wherein said system further includes a restricted pressure medium connection, which terminates between said front-wheel brake inlet valve and said front-wheel brake, and which is connected to the pressure side of said auxiliary-pressure pump.

33. A hydraulic brake system according to claim 32 further including a throttle connected upstream of said front-wheel brake.

34. A hydraulic brake system according to claim 33 said pressure-medium displacing element is a screw-in insert unit.

35. A hydraulic brake system according to claim 20 further including a valve housing block within which said pressure modulation valves are housed and wherein said pressure-medium displacing element has a housing which is an integral part of said valve housing block.

36. A hydraulic brake system according to claim 20 wherein said pressure-medium displacing element includes:

(a) a housing, and (b) a stepped piston sealed in said housing and having a first piston end surface acted upon by the pressure of said auxiliary-pressure pump and a second piston end surface having a nominal diameter smaller than the diameter of said first piston end surface and acted upon by the pressure of said rear-wheel brake.

* * * * *